UNITED STATES PATENT OFFICE.

JOSEPH LOUDENSLAGER, OF TIFFIN, OHIO.

BOILER COMPOUND.

SPECIFICATION forming part of Letters Patent No. 720,267, dated February 10, 1903.

Application filed May 10, 1901. Renewed January 2, 1903. Serial No. 137,567. (No specimens.)

*To all whom it may concern:*

Be it known that I, JOSEPH LOUDENSLAGER, of Tiffin, in the county of Seneca, State of Ohio, have invented a certain new and useful Boiler Compound, of which the following is a complete specification.

The object of my invention is to produce an improved compound for preventing incrustation of boilers which is economical and efficient in use.

My compound is composed of the following ingredients in the proportions specified: two pounds of catechu, gambier, or japonica; one pound of potash, preferably made from wood-ashes; two pounds of soda-ash, and one pound of German or Spindel salts.

The term "German salts" is one which is used commercially to denominate the salts of a certain German spring, known also as "Spindel salts," of which the following is an analysis: calcium sulfate, .020 grams; sodium bicarbonate, .360 grams; sodium chlorid, .180 grams; sodium sulfate, .440 grams; total, 1,000 grams.

In the appended claim I shall use the term "catechu" in a generic sense to include a substance variously denominated "catechu," "gambier," and "japonica."

The composition is prepared as follows: The gambier, catechu, or japonica is first steamed for two hours, and then the other ingredients are added and the mixture is steamed for one hour longer. Finally enough water is added to reduce the mixture to a liquid state, in which it can be filtered or strained. After filtration the compound is ready for use.

In practice one gallon of the compound to every fifty-horse power of boiler should be supplied at one time to the boiler after it is cleaned. The composition should be supplied to the boiler each week, and the boiler should be cleaned every two weeks.

The proportions of the ingredients specified may be varied somewhat; but I obtain the best results through the employment of the ingredients specified and substantially in the proportions named.

The application of heat as specified is conveniently and preferably obtained by steaming; but other methods of applying heat and at the same time keeping the ingredients moist might be employed.

What I claim is—

A boiler compound consisting of catechu, potash, soda-ash and German salts, combined substantially in the manner and in the proportions specified.

In testimony of all which I have hereunto subscribed my name.

JOSEPH LOUDENSLAGER.

Witnesses:
LEWIS A. BLUTHART,
J. FRANK DAUGHERTY.